US006598387B2

(12) United States Patent
Carberry et al.

(10) Patent No.: US 6,598,387 B2
(45) Date of Patent: Jul. 29, 2003

(54) REDUCTION OF EXHAUST SMOKE EMISSIONS FOLLOWING EXTENDED DIESEL ENGINE IDLING

(75) Inventors: Brendan Patrick Carberry, Aachen (DE); David Arthur Ketcher, Chelmsford (GB); Paul Eduard Moraal, Vaals (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/745,360

(22) Filed: Dec. 21, 2000

(65) Prior Publication Data

US 2002/0078681 A1 Jun. 27, 2002

(51) Int. Cl.$^7$ ................................................ F01N 3/00
(52) U.S. Cl. .......................... 60/297; 60/274; 60/285; 60/286; 60/300
(58) Field of Search .................... 60/274, 284, 285, 60/286, 295, 297, 300, 303, 311

(56) References Cited

U.S. PATENT DOCUMENTS

| 4,467,601 A | * | 8/1984 | Watanabe ................. 60/285 |
| 4,535,588 A | * | 8/1985 | Sato et al. ................ 60/286 |
| 4,756,155 A | * | 7/1988 | Shinzawa ................. 60/285 |
| 5,014,509 A | * | 5/1991 | Broering et al. ........... 60/274 |
| 5,207,990 A | * | 5/1993 | Sekiya et al. ............. 60/303 |
| 5,711,149 A | * | 1/1998 | Araki ..................... 60/286 |
| 5,716,586 A | * | 2/1998 | Taniguchi ................ 60/285 |
| 5,974,791 A | * | 11/1999 | Hirota et al. ............. 60/303 |
| 6,244,046 B1 | * | 6/2001 | Yamashita ................ 60/285 |
| 6,336,320 B1 | * | 1/2002 | Tanaka et al. ............ 60/285 |

FOREIGN PATENT DOCUMENTS

JP          3-18614      *   1/1991

* cited by examiner

*Primary Examiner*—Thomas Denion
*Assistant Examiner*—Tu M. Nguyen
(74) *Attorney, Agent, or Firm*—Tung & Associates; Carlos L. Hanze

(57) ABSTRACT

A diesel engine equipped with an exhaust gas particulate filter includes a control system that reduces exhaust gas smoke emissions normally resulting from an extended period of engine idling. The control method periodically raises the exhaust gas temperature in order to purge the particulate filter of water and hydrocarbons that build up during extended engine idling and cause exhaust smoke. A timer records the elapsed period during which the engine remains at idle and the exhaust temperature is below a threshold level. When the recorded time period exceeds a preselected value, the filter is purged by elevating the exhaust gas temperature to a level sufficient to oxidize the gaseous hydrocarbons and evaporate any water that may have accumulated in the filter.

9 Claims, 3 Drawing Sheets

US 6,598,387 B2

REDUCTION OF EXHAUST SMOKE EMISSIONS FOLLOWING EXTENDED DIESEL ENGINE IDLING

FIELD OF THE INVENTION

The present invention broadly relates to diesel engines equipped with exhaust gas particulate filters, and deals more particularly with a method for reducing exhaust smoke emissions following a period of extended engine idling or low load operation.

BACKGROUND OF THE INVENTION

Emission after-treatment devices are used to collect particulate matter from the exhaust gas of internal combustion engines. In particular, conventional emission treatment devices for diesel engines include particulate filters, oxidation catalysts and nitrous oxide (NOx) catalysts. A problem exists with particulate filters in that the particulates, which consist largely of carbon particles, tend to plug the filters, resulting in a restriction to the flow of exhaust gas. In order to periodically regenerate or purge the filter from particulates, it is known to take measures which result in an increase of the exhaust gas temperature above a predetermined level (e.g. above 450° C.) in order to incinerate the carbon particles accumulated in the filter.

One conventional method used to increase the exhaust gas temperature involves controlling a throttle valve in the intake manifold of the engine. In particular, it is known that by throttling/closing the throttle valve, the exhaust gas temperature may be increased. Numerous methods have been used for controlling the throttle valve. For example, in one conventional method, the intake throttle valve is controlled by utilizing the difference between a calculated target intake manifold pressure, and an actual intake manifold pressure. The target intake manifold pressure is calculated using an engine speed and engine load. Normally, regeneration of the particulate filter through an increase in the exhaust gas temperature is accomplished during light engine load operation. The regeneration process is scheduled by engine control software based on an estimate of the particulate loading.

When a diesel engine remains at idle speed or low load operation for an extended length of time, gaseous hydrocarbons as well as water accumulate in the particulate filter, primarily because the exhaust gas temperature falls to a relatively low level that is inadequate to evaporate the accumulation. A large accumulation of gaseous hydrocarbons and water results in the production of blue or white smoke in the exhaust gas when the engine is accelerated above idle speed with resulting higher exhaust temperature. This production of exhaust smoke is highly undesirable Thus, there is a clear need for a method for reducing exhaust smoke emissions following extended diesel engine idling or low load operation.

SUMMARY OF THE INVENTION

The present invention provides a method of reducing smoke emissions in diesel engine exhaust following a period of extended diesel engine idling or low load operation.

According to one aspect of the invention, a method is provided for periodically purging a diesel particulate filter used to capture diesel particulates in the exhaust of a diesel engine, comprising the steps of sensing when the engine is operating at a speed corresponding to an idle condition or low load; determining when the engine has remained at the idle speed or low load condition for a predetermined length of time; and, increasing the temperature of the exhaust gas entering the filter to a preselected temperature sufficient to purge the filter, but only after it has been determined that the engine has been idling or at low load for a predetermined time period.

The method is preferably carried out by storing a count corresponding to the length of time that the exhaust gas temperature is less than a predetermined temperature below which gaseous hydrocarbons and water accumulate in the filter. A timer for storing the time count is incremented while the engine remains at idle speed or low load, and is decremented when the exhaust temperature rises above a second threshold value at which purging of the filter. When the time count exceeds a preselected value corresponding to a condition well before the filter has accumulated an amount of hydrocarbons and water that could result in smoke emissions, a purging event is initiated in order to oxidize the gaseous hydrocarbons and evaporate the water, thereby reduce the possibility of smoke emissions from the engine's exhaust.

According to another aspect of the invention, a method of reducing smoke emissions in the exhaust of a diesel engine equipped with a diesel particulate exhaust filter is provided, which comprises the steps of sensing the temperature of the exhaust gas entering the filter; starting a time count when the sensed exhaust temperature is below a preselected value and the engine is operating at a speed corresponding to an idle or low load condition; purging the filter by increasing the temperature of the exhaust gas; sensing the temperature of the exhaust gas exiting the filter; and, resetting the time count when the sensed temperature of the exhaust gas exiting the filter exceeds a second, preselected value greater than the first value.

Accordingly, it is a primary object of the present invention to provide a method of controlling a diesel engine which reduces smoke emissions in the exhaust gas.

Another object of the invention is to provide a method as described above which reduces the accumulation of gaseous hydrocarbons and water in a diesel exhaust particulate filter during extended engine idling or low load operation.

These, and further objects and advantages of the invention will be made clear or will become apparent during the course of the following description of a preferred embodiment of the invention.

DETAILED DESCRIPTION OF THE PREFERRED EMBODIMENT

Figure 1:
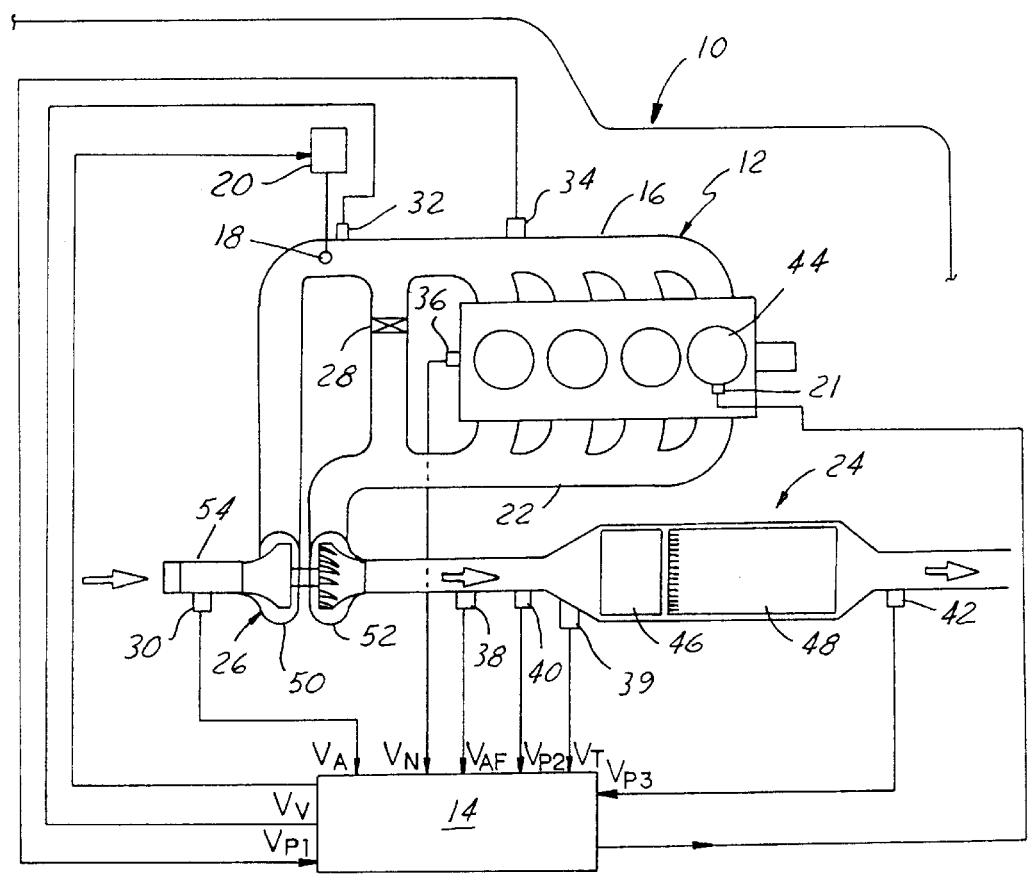
FIG. 1 is a combined block and diagrammatic view of an engine and related control system for carrying out the method forming the preferred embodiment of the present invention.

Referring first to FIG. 1, a vehicle generally indicated by the numeral 10 includes an internal combustion engine 12 and a microcontroller 14. As disclosed herein, the engine 12 is a diesel engine, and includes an intake manifold 16, and a throttle valve 18, a throttle valve actuator 20, a fuel injector 21, an exhaust manifold 22, a filter assembly 24, a turbocharger 26, an EGR valve 28, a mass air flow sensor 30, a throttle valve position sensor 32, a pressure sensor 34, a speed sensor 36, an air/fuel sensor 38, and pressure sensors 40, 42.

The intake manifold 16 receives compressed air from the turbocharger 26 and directs the airflow to cylinders 44 of the engine 12. The configuration of the manifold 16 may vary based upon the number of cylinders 44. The manifold 16 includes the throttle valve 18 disposed therein.

The throttle valve 18 functions to selectively restrict the amount of air flowing through the manifold 16, to thereby control the operation of the engine 12, and in particular to control the exhaust gas temperature of the engine 12. When the valve 18 is throttled (e.g., moved from a full/open position to a partially closed position), the exhaust gas temperature increases. The position of the valve 18 may be controlled to increase the exhaust gas temperature above a pre-determined temperature (e.g., above 450° C.), to regenerate the filter assembly 24. The method for controlling the valve 18 to increase the exhaust gas temperature will be discussed in more detail below. The valve 18 is conventional in the art and may comprise a conventional valve capable of restricting the airflow through the manifold 16. For example, the valve 18 may comprise a butterfly valve or the like.

A throttle valve actuator is provided to move the valve 18 to a specified position. The actuator 20 is conventional in the art and may comprise a pneumatically controlled actuator or a stepper motor actuator or the like. The actuator 20 may respond to electrical signals generated by the microcontroller 14 to adjust the position of the valve 18, thereby varying the flow of air to the manifold 16.

The fuel injector 21 provides fuel to one of the cylinders 44 and is conventional in the art. Although a single fuel injector 21 is illustrated for purposes of simplicity, it is understood that each of the cylinders 44 has a corresponding fuel injector 21. The fuel injector 21 receives fuel from a fuel pump (not shown) and injects a first pre-determined amount of fuel into one of the cylinders 44 during an intake or compression stroke of the corresponding cylinder 44. Further, the fuel injector 21 may be utilized to inject a second, pre-determined amount of fuel into one of the cylinders 44 late in the power stroke (i.e., post-injection of fuel) of the corresponding cylinder 44 to further control the exhaust gas temperature as described in further detail herein below. In particular, the microcontroller 14 may generate controls signals that cause the fuel injector 21 to inject the first and second pre-determined amounts of fuel, respectively, into one of the cylinders 44.

The exhaust manifold 22 directs exhaust gas from the cylinders 44 through the turbocharger 26 to the filter assembly 24. The configuration of manifold 22 may vary based on the number of cylinders 44 in the engine 12. The filter assembly 24 is provided to lower the exhaust gas emissions/particles before the exhaust gas is expelled from the engine 12. The assembly 24 may include an oxidation catalyst 46 and a particulate filter 48.

The oxidation catalyst 46 functions to increase the exhaust gas temperature of the engine 12 prior to the exhaust gas entering the particulate filter 14. In particular, the post-injection of fuel into one or more cylinders 44 results in unburned hydrocarbons being expelled from the cylinders 44 into the oxidation catalyst 46. The oxidation of hydrocarbons in the catalyst 46 is an exothermic reaction resulting in an additional increase in the exhaust gas temperature. Accordingly, the temperature of the exhaust gas exiting the oxidation catalyst is substantially higher (e.g., up to 200° C.) than the exhaust gas entering the filter assembly 24. Exhaust gas within the oxidation catalyst is preferably heated to at least 450° C. before being expelled into the filter 48, thereby regenerating the filter 48.

The particulate filter 48 is provided to capture particulate matter such as carbon particles in the exhaust gas. The filter 48 may be conventional in the art and may comprise a steel/wool filter, a ceramic/monolith filter, or a ceramic/coil filter or the like. As discussed above, the filter 48 must be regenerated/cleaned at certain intervals since the filter 48 may become clogged with carbon particles from the exhaust gas. Further, the filter 48 may be regenerated by throttling the valve 18 and/or post injecting fuel into the cylinders 44 to thereby increase the exhaust gas temperature above a pre-determined, incineration temperature (e.g., 450° C.) of the carbon particles.

The turbocharger 26 compresses the air inducted into the engine 12 and may include a compressor 50 connected to the intake manifold 16, and a turbine 52 disposed between the exhaust manifold and the filter assembly 24.

The EGR valve 28 is provided to reduce NOx emissions from the engine 12. The valve 28 is conventional in the art and is disposed between the intake manifold 16 and the exhaust manifold 22.

The mass airflow sensor 30 disposed in fresh air intake 54 generates a signal $V_A$ indicative of the mass airflow in the intake manifold 16. The microcontroller 14 may receive the signal $V_A$ and derive the measured value of mass airflow MAF from the signal $V_A$. The sensor 30 is conventional in design and is preferably disposed in an inlet 54 upstream of the intake manifold 16.

The throttle valve sensor 32 generates a signal $V_v$ indicative of the position of the valve 18 and is conventional in design. The microcontroller 14 receives the signal $V_v$ and derives the measured position $THR_M$ of the valve 18 from the signal $V_v$. In one embodiment, the measured position $THR_M$ of the valve 18 may have a range of from 0 to 1 wherein the value 0 represents a full-open position (i.e., no throttling) of the valve 18, and the value 1 represents a full-closed position of the valve 18. It should be understood, however, that the position of the valve 18 may be represented in a number of alternate ways. For example, the position of the valve 18 may be represented by a percentage of the full-open or full-closed position, or by a rotation angle associated with the valve 18. The pressure sensor 34 generates a signal $V_{P1}$ indicative of the pressure within the intake manifold 16. The microcontroller receives the signal $V_{P1}$ and derives the measured value of the intake manifold pressure P from the signal $V_{P1}$. The pressure sensor 34 is conventional in design.

The speed sensor 36 generates a signal $V_N$ indicative of the speed of the crankshaft of the engine 12. As microcontroller receives a signal $V_N$ and derives the measured value of the engine speed N from the signal $V_N$. The speed sensor 36 is also conventional in the art.

The air-fuel fuel ratio sensor 38 generates a signal $V_{AF}$ indicative of the air/fuel ratio of the engine 12. Microcontroller 14 receives the signal $V_{AF}$ and derives the measured value of the air/fuel ratio AF from the signal $V_{AF}$. The sensor 38 is conventional in design and is disposed between the turbine 52 and the filter assembly 24.

The temperature sensor 39 generates a signal $V_T$, indicative of the temperature at the inlet of the filter assembly 24. Microcontroller 14 receives the signal $V_T$ and derives the measured value of the exhaust gas temperature T of the exhaust gas entering the filter assembly 24 from the signal $V_T$. The pressure sensors 40, 42 generate signals $V_{T2}$, and $V_{T3}$ respectively, indicative of the pressure at the inlet and outlet, respectively of the filters 24. A microcontroller 14 receives signals $V_{P2}$, $V_{P3}$ and derives the measured values of the inlet and outlet pressures $P_I$, and $P_O$, from the signals $V_{P2}$, $V_{P3}$, respectively. Alternatively the pressure sensors 40, 42 may be replaced by a single differential pressure sensor (not shown) that generates a signal indicative of the pressure drop across the filter assembly 24. Microcontroller 14 may determine whether a regeneration of filter 48 is required based on the difference between the inlet and outlet pressures $P_I$, $P_O$.

Microcontroller 14 controls the engine 12, and in particular, controls the throttle valve 18. Microcontroller 14 is conventional in the art and is electrically connected to the throttle valve actuator 20, the fuel injector 21, the mass air flow sensor 30, the throttle valve position sensor 32, the pressure sensor 34, the speed sensor 36, the air/fuel ratio sensor 38, the temperature sensor 39, and the pressure sensors 40, 42. Microcontroller includes a read/only memory (ROM) (not shown) that stores a software program for implementing the method in accordance with the present invention.

Figure 2:
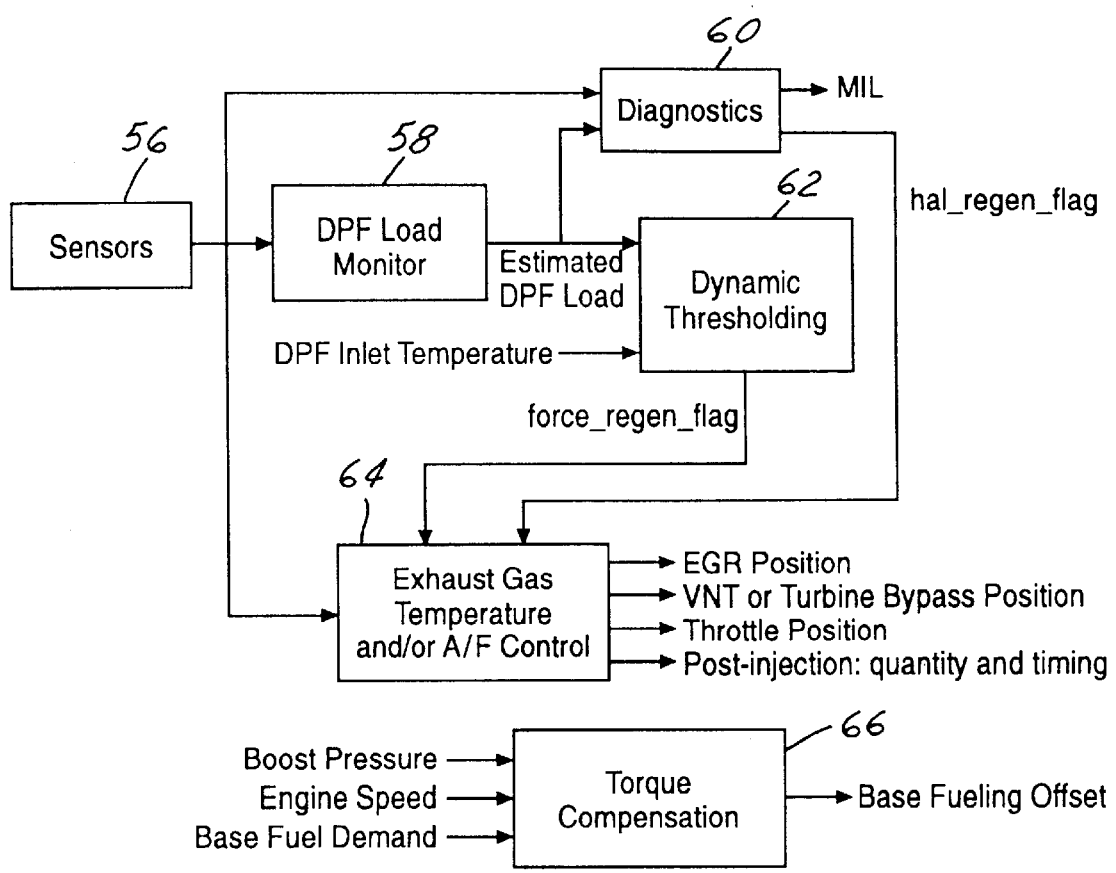
FIG. 2 is a block diagram of the control system shown in FIG. 1.

Attention is now directed to FIG. 2 which depicts the above described control system in block diagram form. A plurality of sensors 56 acquire information from the engine 12 and exhaust gas, and relays this information to a diesel particulate filter load monitor 58, which may comprise hardware or software forming part of the microcontroller 14. The sensors 56 include the previously discussed sensors 30, 32, 34, 36, 38, 39, 40 and 42. The DPF (diesel particulate filter) load monitor 58 records and stores the diesel particulate loading of the filter 48; this load value is essentially a particulate load recorded as a function of a pre-determined, maximum load level which corresponds to a pre-determined level of back pressure to the exhaust gas flowing through the filter assembly 24. The load monitor 58 may optionally include an adaptive algorithm to calculate the accumulated ash in the filter 48. It is desirable to record the amount of ash in the filter 48 because even though it does not contribute to increase exhaust backpressure, it comprises an inert material and thus does not contribute the exothermic reaction occurring during the regeneration process.

The estimated DPF load is sent to both a diagnostics module 60, and a dynamic thresholding module 62, both of which preferably form software routines stored in the microcontroller 14. The diagnostics module 60 also receives information from the sensor 56, and issues a warning MIL when, for any reason, the DPF loading has exceeded a critical threshold that could cause the filter assembly 24 to melt if a regeneration event was initiated. The MIL warning may take the form of turning on a light in the driver's compartment of the vehicle. Similarly, the diagnostics module 60 may issue the same warning if the filter assembly 24 evidences signs of a catastrophic failure, as when the filter becomes clogged or begins to melt to the extent that effective filtration is no longer provided. Finally, the diagnostics module 60 sets a software flag which terminates an on-going regeneration event in the event that the filter 48 exceeds a certain critical temperature, above which the structural integrity of the filter assembly 24 is threatened.

The dynamic thresholding module 62 evaluates the DPF load as well as the temperature at the DPF inlet and makes a determination of when to initiate the regeneration event. When a decision is made to commence regeneration, a flag is set which is delivered to a control module 64 which functions to output a series of signals that control those components of the engine 12 required to raise the exhaust gas temperature to the threshold level necessary to produce DPF regeneration by combusting the accumulated particulates. The control module 64 is also responsive to a halt flag issued by the diagnostic module 60 which results in the termination of an on-going regeneration event. When the regeneration flag is set by the thresholding module 62, control module 64 issues signals to the appropriate control elements of the engine 12 to raise the exhaust temperature to the level necessary to initiate DPF regeneration. For example, first a signal is issued to close the EGR valve and a VNT (if present) or a turbine bypass is set to a fixed position or alternatively to an open position. A signal is then issued by module 64 to control the actuator 20 which operates the valve 18 to throttle the intake in order to initially raise the exhaust temperature to a level necessary to ensure that the oxidation catalyst has reached the so-called light-off temperature. Subsequently, post injection into the cylinders 44 is initiated in order to provide a further increase in the temperature the inlet of the filter assembly 24. In the event that a halt flag is issued by the diagnostics module 60, control module 64 opens the EGR valve 28 which in turn reduces the flow of oxygen to the filter assembly 24.

When the engine's intake is severely throttled back (as much as 500 mbar) the engine's efficiency is decreased and it becomes necessary to compensate for the lack of torque. Therefore, the microcontroller 14 includes a torque compensation module 66 which comprises software that increases the amount of fuel supplied to the engine based on information derived from the sensors 56, including boost pressure, engine speed and base fuel demand. The data output by sensors 56 and modules 58, 60 and 62 are typically sampled at a relatively low rate, for example once per second, whereas module 64 and 66 are sampled at a relatively high rate, for example 16 ms.

When the engine 12 is operating at a relatively low load level for an extended duration, such as when the engine is at idle speed over a period of time, the exhaust temperature drops to a level that too low to oxidize gaseous hydrocarbons and evaporate water, e.g. below approximately 150° C., and as a consequence, these gaseous hydrocarbons and water accumulate in the filter assembly 24. It is to be understood that the term "low load" as used herein is intended to mean engine operation that results in an exhaust gas temperature of below approximately 150° C., which typically would include idle speed conditions as well as engines speeds slightly above idle, depending upon a variety of operating conditions. In accordance with the present invention, the control system shown in FIGS. 1 and 2 may be employed to monitor when the exhaust temperature falls below the threshold level at which the gaseous hydrocarbons and waters may begin accumulating, records the length of time that the monitored temperature remains below the threshold and initiates steps to raise the exhaust temperature above the threshold level. In this manner, the exhaust temperature is periodically elevated, as required, to assure that an inordinate amount of gaseous hydrocarbons and water do not accumulate in the filter assembly 24 when the engine 12 is operating at a low load or idle condition. The exhaust temperature can be raised using a variety of techniques including those discussed above, which include throttling the intake or performing post injection of fuel.

Figure 3:
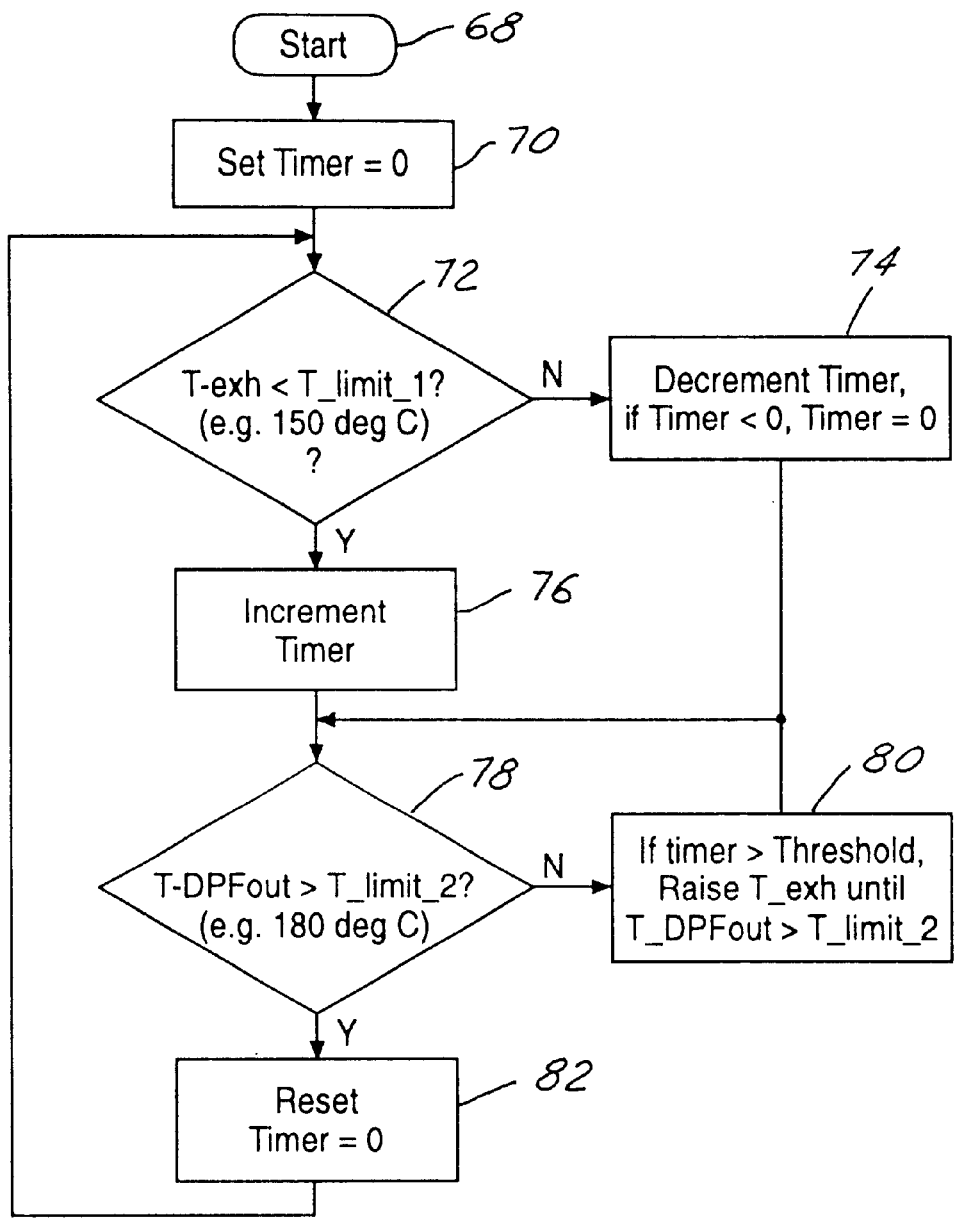
FIG. 3 is a flow chart showing the steps of the method of the present invention, which may be carried out using computer software instructions.

Reference is now made to FIG. 3 which depicts a flowchart showing the basic steps of the method of the present invention which are preferably carried out using software instructions stored in the microcontroller 14. Part of this software may also form sections of the software routines that are resident in the modules shown in FIG. 2.

The method starts at block 68 when the system is initialized, and a timer, which may comprise hardware or software, is set to zero as shown by block 70. As previously discussed, the microcontroller 14 continuously senses the temperature of the exhaust gas both upstream and downstream of the filter assembly 24. At step 72, a determination is made of whether the temperature of the exhaust gas upstream of the filter assembly 24 is greater than a first preselected value, e.g. 150° C., which corresponds to a condition in which the engine is idling or even slightly above idling (i.e. low load), and gaseous hydrocarbons and water may accumulate in the filter 48. If the sensed upstream exhaust gas temperature is greater than the first threshold value, then the timer is decremented at step 74, but if the timer has been decremented to a negative count, it is reset to zero.

On the other hand, if the upstream exhaust temperature is lower than the first threshold value, then the timer is incremented at step 76 following which, at step 78 a determination is made of whether the temperature of the exhaust gas exiting from the filter assembly 24 is greater than a second threshold value higher than the first threshold value, e.g. 180° C. If the sensed temperature of the downstream exhaust gas is less than the second threshold value, then at step 80 the control module 64 (FIG. 2) is instructed to take steps to raise the temperature of the exhaust gas until the sensed temperature of the gas exiting the filter assembly 24 is greater than the second threshold limit. The step of raising the exhaust temperature indicated at block 80 is carried out only after the time count exceeds a threshold value corresponding to a condition in which the engine has remained at an idle or low load condition for a preselected length of time where hydrocarbons and water may have accumulated in the filter assembly 24.

When the sensed temperature of the exhaust gas exiting the filter assembly 24 exceeds the second, higher threshold limit indicating that the filter has been purged of water and gaseous hydrocarbons, the timer is reset to zero at step 82 and the sequence returns to repeat steps 72–82.

It can be appreciated from the above that smoke emissions in diesel engine exhaust resulting from extended engine idling can be substantially reduced by sensing when the engine is operating at idle or low load, determining when the engine has remained at idle or low load for a pre-determined length of time and increasing the temperature of the exhaust gas entering the particulate filter sufficient to purge the filter before a load demand is placed on the engine which would otherwise generate exhaust smoke because of the gaseous hydrocarbons and water accumulated in the filter. The stored time count is preferably compared with a preselected value corresponding to a condition in which a predetermined amount of gaseous hydrocarbons and water have accumulated in the filter. This accumulation is normally dependent upon the length of time that the engine has remained at idle speed or low load operation. The method also provides for decrementing the timer when the upstream exhaust temperature is above a preselected value indicative of engine speeds above idle or low load. Thus, the timer effectively maintains a running count that is related to an estimated amount of gaseous hydrocarbons and water accumulated in the filter.

From the foregoing, it may be appreciated that the technique of reducing exhaust smoke emissions described above not only provides for the reliable accomplishment of the objects of the invention but does so in a particularly effective and economical manner. It is recognized, of course, that those skilled in the art may make various modifications or additions chosen to illustrate the invention without departing from the spirit or scope of the present contribution to the art. Accordingly, it is to be understood that the protection sought and to be afforded hereby should be deemed to extend to the subject matter claimed and all equivalents thereof fairly within the scope of the invention.

What is claimed is:

1. For use with a diesel engine having an exhaust particulate filter, a method of purging said filter of gaseous hydrocarbons and water accumulated in said filter during low load operation of said engine, comprising the steps of;
    (A) sensing when said engine operating at a low load condition;
    (B) determining when said engine has remained in said low load condition for a predetermined period of time by commencing a count from a beginning count value during the time that said engine remains at said low load condition;
    (C) when said period has been determined in step (B), increasing the temperature of the exhaust gas entering said filter to a temperature sufficient to purge said filter of said gaseous hydrocarbons and water;
    (D) sensing the temperature of the exhaust gas exiting said filter; and,
    (E) decrementing said time count during the period that said filter is being purged in step (C), such that said time count is continuously related to the magnitude of the gaseous hydrocarbons and water accumulated in said filter;
    (F) when the temperature sensed in step (D) reaches a value indicating that the purge of said filter has been completed, terminating step (C) and resetting said time count to said beginning count value.

2. The method of claim 1, wherein step (B) includes periodically incrementing a timer during the period that the sensed temperature of said exhaust gas remains below a value indicating that said filter is not fully purged.

3. The method of claim 1, wherein step (C) is performed by throttling the intake of said engine.

4. The method of claim 1, wherein step (C) includes performing post injection of fuel to the combustion cylinders of said engine.

5. A method of reducing smoke emissions in the exhaust of a diesel engine equipped with a diesel particulate exhaust filter, comprising the steps of:
    (A) sensing the temperature of the exhaust gas entering said filter;
    (B) commencing a time count from a beginning count value when the exhaust temperature sensed in step (A) is below a first preselected value indicative of low load operation of said engine in which gaseous hydrocarbons and water may accumulate in said filter;
    (C) purging said filter of said gaseous hydrocarbons and water by increasing the temperature of said exhaust gas above said first preselected value;
    (D) decrementing said time count during the period that the temperature sensed in step (A) is above said first preselected value, such that said time count is continuously related to the magnitude of the gaseous hydrocarbons and water accumulated in said filter;
    (E) sensing the temperature of exhaust gas exiting said filter; and
    (F) resetting said time count to said beginning count value when the temperature sensed in step (E) exceeds a second preselected value greater than said first value.

6. The method of claim 5, wherein step (B) includes incrementing a counter, and step (D) is continued during said period until said time count equals said beginning count value.

7. The method of claim 5, wherein step (C) includes altering the operation of said engine until the temperature of said exhaust gas is sufficient to oxidize gaseous hydrocarbons and evaporate water contained in said filter.

8. The method of claim 5, wherein step (C) is performed by throttling the intake of said engine until an oxidation catalyst of said filter achieves light off.

9. The method of claim 5, wherein step (C) includes performing post injection of fuel to the combustion cylinders of said engine.

* * * * *